Sept. 16, 1941.    T. L. HEDGPETH    2,255,884
V BELT
Filed June 28, 1940

Inventor:
Theron L. Hedgpeth
By
M c Caleb E. Wendt
Attys

Patented Sept. 16, 1941

2,255,884

UNITED STATES PATENT OFFICE 2,255,884

V BELT

Theron L. Hedgpeth, Oak Park, Ill., assignor to Duro Metal Products Company, Chicago, Ill., a corporation of Illinois Application June 28, 1940, Serial No. 342,871

4 Claims. (Cl. 74—234)

The present invention relates to V-belts and is particularly concerned with V-belts adapted to be manufactured of rubber with suitable means for reenforcing the belt against tension and reenforcing its working faces against wear.

When a V-belt is passed about small pulley, as is often the case, the belt tends to expand at its inner face, and, due to the tension in its outer face, it tends to contract. The expansion of the inner face is caused by the compression at that face due to the shortening of that face by the sharp curvature about the pulley.

In a similar way, the stretch or tension of the outer face, when there is a sharp curve produced in the belt about a pulley, tends to produce a lengthening and contraction of the width of the belt between the working faces.

One of the objects of the present invention is the provision of an improved V-belt of rubber or other suitable material, the structure of which is adapted to facilitate this alternating expansion and contraction which takes place in the section of the belt as any given part of the belt passes around a small pulley and a large pulley alternately.

Another object of the invention is the provision of an improved rubber V-belt of the class described, which has its tension reenforcing best located to give the belt a substantially constant length and to permit alternate expansion and contraction of the section of the belt.

Another object of the invention is the provision of an improved V-belt structure by means of which the working faces are suitably reenforced against wear and the wearing material is suitably sealed in the structure of the belt so that its edges can never become exposed and so that there is no possibility of oil or other deteriorating influences penetrating the interior of the belt and damaging the tension reenforcing.

Another object of the invention is the provision of a rubber V-belt which is adapted to be used for a longer period of time before it is necessary to replace the belt and which is adapted to be manufactured more economically than the devices of the prior art.

Other objects and advantages of the invention will be apparent from the following description and the accompanying drawing, in which similar characters of reference indicate similar parts throughout the several views.

Figure 1:
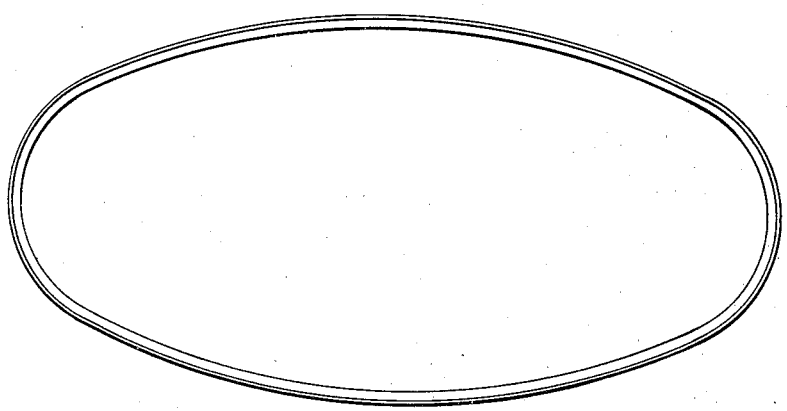
Figure 1:
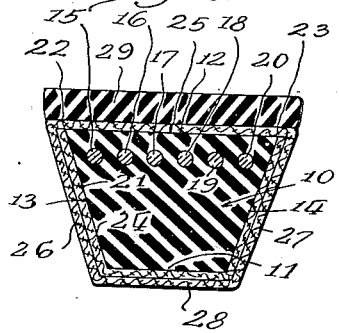
Figure 1:
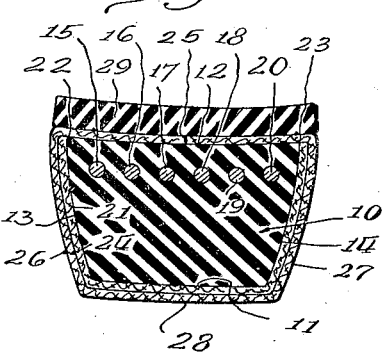
Figure 1:
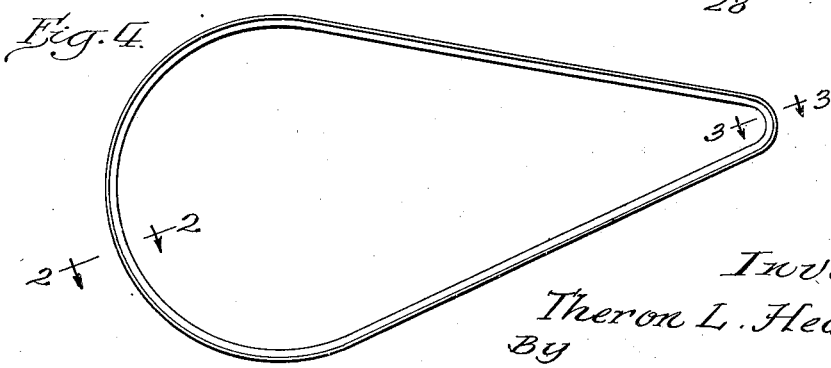

Referring to the single sheet of drawings accompanying this specification,

Figure 1 is an elevational view of the endless V-belt showing the normal shape of the belt which does not produce any distortion in the section of the belt. Some deviations from this circular shape may be made without producing noticeable distortion of the cross-sectional shape, but such belts are usually employed for engagement with driving and driven pulleys of widely different size and this involves the belt curving sharply about a relatively small pulley;

Figure 2 is an enlarged cross-sectional view taken at right angles to the length of the belt showing the details of its structure;

Figure 3 is an enlarged sectional view of the same belt as it appears when it is distorted in being drawn tightly about a small pulley; and Figure 4 is an elevational view of the belt as it might appear when passing about a very small and a relatively large pulley, with notations indicating where the sections are taken on the planes of the lines 2—2 and 3—3 for Figures 2 and 3.

The present V-belt is preferably endless and has its body 10 of live resilient rubber, the entire belt being molded in one integral piece. The shape of the body 10 is trapezoidal, having the inner and outer flat parallel sides 11 and 12 respectively and the oppositely sloping working sides 13 and 14.

The slope of these working sides of the body corresponds substantially to the slope of the groove in the V-pulleys with which the belt is to be used. The body 10 of the V-belt preferably has a multiplicity of strong cords 15—20 embedded in the body and equally spaced from each other and located inwardly of, but close to, the outer side 12 of the body.

These cords may be strong cotton cords which are impregnated with and embedded in the rubber stock and they are separated from each other and have no connection with each other so that the rubber stock is adapted to expand and contract between the cords.

The inner face 11 and the sides 13 and 14 of the body 10 are preferably covered with a layer of fabric indicated at 21 which extends from the corner 22 at the outer side 12 down across the side 13, the inner side 11, and the other side 14 of the belt to the corner 23.

Another layer indicated at 24 preferably extends fully around all sides of the body 10 embracing also the inner layer of fabric 21 and having its edges abutting at 25 midway between the borders of the outer side of the body 10.

In other embodiments of the invention the abutting joints of the edges indicated at 25 may be made at other points on the side 12 which are not located midway between the edges of the belt.

These layers of fabric are impregnated with the rubber stock and secured to the body by vulcanizing and cohesion and they may consist of layers of tightly woven cotton fabric which provide the working faces 26 and 27 of the belt and the inner face 28 with a reenforced wearing surface that is adapted to withstand the wear to which the working faces are subjected.

Since this layer is continuous and extends about all of the corners, there is no possibility of the fabric being loosened except after it is worn through completely, and even then the inner layer 21 may still hold the working faces of the belt intact sufficiently to give additional service.

The back side of the belt is preferably provided with an additional layer of resilient live rubber indicated at 29 which is also vulcanized to the fabric layer 24 over the abutting edges of the fabric at 25. The resilient live rubber layer 29 extends to the edges of the belt and may have itse edges beveled or cut off at right angles to the planes of its body surfaces.

This layer 29 of rubber on the back surface of the belt serves to seal the abutting edges together at 25 and to prevent the access of moisture or oil to the edges of the reenforcing fabric or to the reenforcing tension cords 15—20. The location of the abutting joint at 25 permits expansion of this part of the belt through the stretching of the rubber layer 29 and this expansion also is permitted by the separation between the cords 15—20.

When such a belt passes around a relatively small pulley, as shown at the right in Figure 4, the cross-section may approximate that shown in Figure 3 involving a contraction of the outer surface and a slight curvature and an expansion of the inner face. When such a belt passes around a large pulley, as shown in Figure 4, it involves an expansion of the outer surface and a contraction of the inner face.

The present V-belt is adapted to permit this contracting and expanding action without producing undue strain upon its reenforcing elements and therefore the belt is adapted to serve for a longer period of time before it is necessary that the belt be replaced.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A rubber V-belt comprising a substantially trapezoidal rubber body characterized by the absence of reenforcing elements except a plurality of separate cords located adjacent the outer surface of the belt and separated from each other by parts of the rubber body, said belt being provided with a fabric wearing surface extending over its inner face and both of the working sides of said belt and about the outer corners to the outer face of the belt, and the edges of said fabric being sealed by the application of an additional strip of live resilient rubber vulcanized over the fabric at the outer face thereof, said belt having an additional layer of fabric located under the first-mentioned layer and extending over the working sides and inner face of said belt.

2. A rubber V-belt adapted to expand and contract in cross-sectional shape as it passes about pulleys of different size, comprising a rubber body having a plurality of separate tension reenforcing members located near the outer face but imbedded in said body, said tension members being spaced from each other, and a layer of wear-resisting fabric vulcanized to said rubber body and impregnated with the rubber of said body extending over the working faces of the V-belt and the inner face thereof, and a second layer of wear-resisting fabric extending over the same working faces and inner face and having its edges brought into abutting relation on the outer face of said belt.

3. A rubber V-belt adapted to expand and contract in cross-sectional shape as it passes about pulleys of different size, comprising a rubber body having a plurality of separate tension reenforcing members located near the outer face but imbedded in said body, said tension members being spaced from each other, and a layer of wear-resisting fabric vulcanized to said rubber body and impregnated with the rubber of said body extending over the working faces of the V-belt and the inner face thereof, and a second layer of wear-resisting fabric extending over the same working faces and inner face and having its edges brought into abutting relation on the outer face of said belt, and a sealing layer of live resilient rubber vulcanized to said latter layer at the outer face of said belt for the purpose of securing its edges against wear and sealing the reenforcing elements of said belt against ingress of oil or other deteriorating elements.

4. An endless resilient belt of wedge shape adapted to expand and contract in cross-sectional shape as it passes around pulleys of different size, comprising a resilient gum body of trapezoidal shape having embedded therein a plurality of tension reenforcing members located between the outer and inner faces of said member and a layer of wear-resisting fabric extending across the inside of said belt and outwardly across the working faces of said belt and over the outer corners of the belt, said fabric being continuous from the outer face of said belt around the belt to the outer face thereof, and a sealing layer of live resilient gum vulcanized to said fabric on the outer face of said belt for the purpose of securing its edges against wear and sealing the reenforcing elements of said belt against ingress of oil or other deteriorating elements, said belt also having a second layer of wear-resisting fabric located inside the first-mentioned layer and extending over the working faces and inside of said belt.

THERON L. HEDGPETH.